United States Patent [19]

Akutagawa

[11] Patent Number: 4,501,544
[45] Date of Patent: Feb. 26, 1985

[54] APPARATUS FOR CONTINUOUSLY AND AUTOMATICALLY MOLDING CHOCOLATE BLOCK HAVING ORNAMENTAL RELIEF PATTERN

[75] Inventor: Tokuji Akutagawa, Tokyo, Japan

[73] Assignee: Akutagawa Confectionery Co., Ltd., Tokyo, Japan

[21] Appl. No.: 559,179

[22] Filed: Dec. 7, 1983

[30] Foreign Application Priority Data

May 31, 1983 [JP] Japan .................................. 58-94909

[51] Int. Cl.³ .................. B29D 31/00; B29C 1/00; A23G 7/00; A23G 1/26
[52] U.S. Cl. .................................... 425/218; 425/225
[58] Field of Search ............... 425/130, 134, 215, 216, 425/218, 219, 220, 217, 99, 100, 231, 225; 426/512, 515

[56] References Cited

U.S. PATENT DOCUMENTS

| 1,894,077 | 1/1933 | Winkler et al. | 425/215 |
| 3,940,218 | 2/1976 | Steels | 425/134 |
| 4,068,993 | 1/1978 | Dacey et al. | 425/134 |

Primary Examiner—Willard E. Hoag
Attorney, Agent, or Firm—Keil & Weinkauf

[57] ABSTRACT

An apparatus for automatically molding a chocolate block is provided according to the invention. The chocolate block includes an ornamental relief pattern made of first chocolate material of one color and a body portion carrying the relief pattern and made of a second chocolate material of different color. The chocolate block is produced by combining a first mold for molding the first chocolate material and a second mold for molding the second chocolate material. The second chocolate material adhering on the face of the first mold is cleaned by cleaner means such as a roller, scraper or a rinsing chamber.

12 Claims, 9 Drawing Figures

4,501,544

APPARATUS FOR CONTINUOUSLY AND AUTOMATICALLY MOLDING CHOCOLATE BLOCK HAVING ORNAMENTAL RELIEF PATTERN

BACKGROUND OF THE INVENTION

1. Field of the Invention

The present invention relates to an apparatus for molding chocolate, and particularly to an apparatus for molding chocolate blocks each including an ornamental relief pattern made of a first chocolate material of one color and a body portion carrying the ornamental relief pattern and made of a second chocolate material of different color through a continuous automation system.

2. Prior Art

In a known process for molding a chocolate block having an ornamental relief pattern, a first chocolate material for forming the ornamental relief pattern is heated to be fluidized and then cast into a first or lower mold having a smooth top face and one or more engraved mold cavities forming the ornamental relief patterns, such as desired design or letters. After scraping the top face of the first mold, the first chocolate material is cooled at some extent, and a second or upper mold having one or more through-openings is placed on the first mold. Before the first chocolate material contained in the engraved mold cavities of the first mold is not yet solidified, a second chocolate material having color different from that of the first chocolate material is heated to be fluidized and then cast into the through-openings of the second mold. After the first and second chocolate materials are crystallized and solidified, the upper or second mold is separated from the lower or first mold to remove the molded chocolate block from the combined molds.

However, in the known process, the fluidized second chocolate material tends to penetrate into the gap inevitably formed at the interface between the top face of the lower mold and the bottom frace of the upper mold. The penetrating second chocolate material having the color and quality different from those of the first chocolate material adheres on the top face of the first mold, and the thus adhering second chocolate material is mixed with the first chocolate material at the scraping step of the next operation cycle, thereby to deteriorate the quality and appearance of the product chocolate block, resulting in loss of commercial value of the product. In the conventional process, the residual second chocolate material adhering on the top face of the lower mold surrounding the engraved cavities for molding the ornamental relief pattern is removed by manual operations. However, such manual operations are time consuming and ineffective.

OBJECT AND SUMMARY OF THE INVENTION

A principal object of this invention is to provide an apparatus for continuously and automatically molding chocolate blocks each including an ornamental relief pattern of one color forming desired design, such as letters or figure, and carried by a body chocolate material of different color.

Another object of this invention is to provide an apparatus for continuously and automatically molding chocolate blocks each including an ornamental relief pattern, the apparatus being provided with cleaner means for removing the chocolate materials adhering on the molds.

A further object of this invention is to provide an apparatus for continuously and automatically molding chocolate blocks with high efficiency each block including a three dimensional ornamental pattern of one color carried by a body chocolate material of different color.

A still further object of this invention is to provide an apparatus for continuously and automatically molding chocolate blocks each including an ornamental relief pattern of one color carried by a body chocolate material of different color, the chocolate material forming the ornamental relief pattern being prevented from mixing with the chocolate material forming the body portion.

The above and other objects of this invention will become apparent from the following detailed description of the invention.

The present invention provides an apparatus for continuously and automatically molding a chocolate block including an ornamental relief pattern made of a first chocolate material of one color and a body portion carrying said ornamental relief pattern and made of a second chocolate material of different color, comprising:

(a) conveyor means for carrying thereon a plurality of first molds successively placed at intervals, each first mold having a top face provided with at least one engraved mold cavity;

(b) means for casting a fluidized first chocolate material for forming said ornamental relief pattern into each of the engraved mold cavities of said first molds one by one;

(c) a scraper for scraping the top face of each first mold to press said first chocolate material into said engraved mold cavity and to scrape off the excess first chocolate material;

(d) a first cooler for cooling said first chocolate material contained in said engraved mold cavity of said first mold;

(e) means for placing a second mold in situ on each of said first molds, said second mold having at least one through-opening defining said body portion;

(f) means for casting a fluidized second chocolate material into said second mold combined with said first mold through said through-opening;

(g) a second cooler for successively cooling said first and second chocolate materials contained in the combined first and second molds to solidify the same;

(h) means for removing the solidified first and second chocolate materials from the molds to obtain an integral product chocolate block; and (i) cleaner means for cleanig said first molds to remove the chocolate materials adhering thereon, said cleaner means being disposed between said means (b) and said means (h).

DESCRIPTION OF THE PREFERRED EMBODIMENTS:

Preferred embodiments of the present invention will now be described with reference to the appended drawings.

Figure 1:
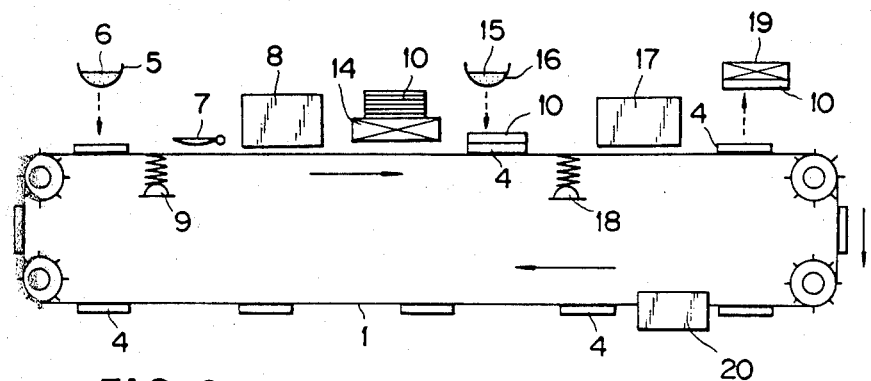
FIG. 1 is a schematic view showing the general construction of the apparatus of this invention.
Figure 2:
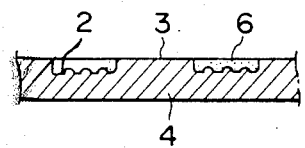
FIG. 2 is a cross section showing a portion of the first mold in which the first chocolate material is cast and then pressed into the engraved mold cavity by the casting and scraping operations.

Referring to FIG. 1, a conveyer 1 carries a plurality of lower or first molds 4 arranged at pre-set intervals. Although an endless belt conveyer is used in the illustrated embodiment, any other conveyer means, such as chain conveyer, may be used. The conveyer 1 is moved intermittently by a combination of a timer and a prime mover (not shown). Each of the first mold 4 has a generally flat and smooth top face 3, as shown in FIG. 2, and the top face 3 is provided with at least one engraved mold cavity 2, each having a minimum width of 200 microns and a depth of 100 microns to about 1 mm, for containing therein a first chocolate material which forms an ornamental relief pattern including letters or designed figure. The cross section of the first or lower mold 4 is shown in FIG. 2 in an enlarged scale, in which the engraved mold cavities are shown by reference numeral 2. The first mold 4 is generally made of a synthetic resin, such as polystyrene or polycarbonate, or a metal.

A container 5 for storing a fluidized first chocolate material 6 is disposed above the conveyer 1, and the fluidized first chocolate material 6 is fed to the first mold 4 moved to the position just beneath the container 5 in a quantity substantially equal to the volume of the engraved mold cavity 2.

Although a so-called white chocolate material is generally used as the first chocolate material, the first chocolate material is not limited to the white chocolate material but may be selected from a variety of chocolate materials having desired colors by the addition of edible pigments. The first chocolate material 6 contained in the container 5 has been pre-treated through the known conching and tempering steps and maintained at a temperature of about 29° to 31° C. in a fluidized condition.

At the downstream of the travelling direction of the conveyer 1 (the travelling direction of the conveyer 1 being shown by the real line arrow in FIG. 1), a scraper 7 is disposed to scrape the top face 3 of the first mold 4 to press the first chocolate material 6 into the engraved mold cavity 2 and to scrape off the excess first chocolate material 6.

Figure 3:
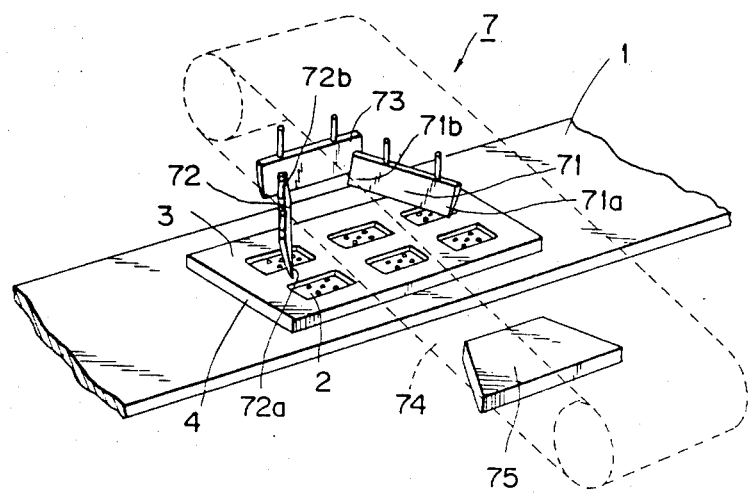
FIG. 3 is a perspective view showing the scraper.

The details of the scraper 7 is shown in FIG. 3. The illustrated embodiment of the scraper 7 has three blades 71, 72 and 73 which move across the first mold 4 in the direction perpendicular to the travelling direction of the conveyer 1 while the conveyer 1 is stopped. The blades 71, 72 and 73 are carried by a rotating belt 74 shown by broken lines in FIG. 3. The blades 71 and 72 are combined with the blade 73 with their base end 71b and 72b abutting against the front face of the blade 73, and the blades 71 and 72 extend at some angles from the front face of the blade 73 so that the fore end portions 71a and 72a are separated by proper distance to cover the top face of the first mold 4 to be scraped. Upon movement of the scraper 7 across the mold 4, the first chocolate material is pressed into the engraved mold cavities 2 and the excess chocolate material is scraped by and moved along the blades 71 and 72. By a further movement of the scraper 7, the top face 3 of the mold 4 is scraped by the blade 73 so that the excess chocolate material is scraped therefrom to be collected in a collector (not shown) disposed at the side of the conveyer 1. The blades 71, 72 and 73 contact with a blade cleaner 75 having a contour adapted to scrape off the chocolate material adhering on these blades. The conveyer 74 is moved at a speed controlled in a timed relationship with the intermittent movement of the conveyer 1 so that the scraper 7 contacts with the top face of the next first mold 4 while the conveyer 1 is held stationary.

The first mold 4 may be vibrated by a vibrator 9 disposed below the conveyer 1 to remove air bubbles from the first chocolate material prior to the scraping operation.

The first mold 4 carrying the first chocolate material in its mold cavity 2, as shown in FIG. 2, is then passed through a first cooler 8. The temperature in the first cooler 8 may be varied depending on the thickness of the first chocolate material contained in the engraved mold cavity 2 of the mold 4, and generally maintained at about 4° to 7° C. The cooler 8 has a length so that each first mold 4 is contained therein for a residence time of generally 2 to 3 minutes during which the surface temperature of the first chocolate material is rapidly cooled to 18° to 22° C. and the base oils and fats contained in the first chocolate material are crystallized to form fine crystallites. The first chocolate material should not be solidified by this cooling step, but the cooling is effected to cool the surface temperature of the first chocolate material to about 18° to 22° C. rapidly and to crystallize the base oils and fats contained in the first chocolate material. The length of the cooler 8 is adjusted or the travelling speed of the conveyer 1 is controlled such that the first mold 4 passes through the cooler 8 while the crystallization of base oils and fats in the first chocolate material is still taking place.

Figure 4:
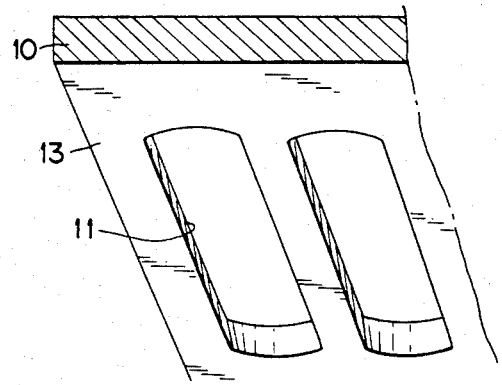
FIG. 4 is a perspective view showing a lower or bottom portion of the second mold.

Adjacent to the first cooler 8, there is disposed a device 14 for placing upper or second molds 10 successively on respective first molds 4. As shown in FIG. 4, each second mold 10 has at least one throughopening 11 which forms a mold cavity defining the final contour of the molded chocolate block. The depth of the throughopening 11 is not critical and may be varied to mold a product chocolate block having a desired thickness. The second mold 10 has a bottom face 13 which contacts closely with the top face 3 of the first mold 4.

In the illustrated apparatus shown in FIG. 1, a plurality of upper or second molds 10 is stacked in the device 14, and one second mold 10 is placed on each first mold 4 moved to the position just beneath the device 14. The second mold 10 may be, in general, made of a synthetic resin, such as polystyrene or polycarbonate, or a metallic material.

Figure 5:
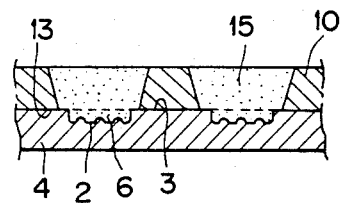
FIG. 5 is a cross section showing a portion of the combined first and second molds in which the first and second chocolate materials are cast.

A second chocolate material 15 is contained in a second container 16 disposed next to the device 14 and is stored in the container 16 in the condition similar to that described hereinbefore as to the condition of the first chocolate material. The second chocolate material 15 is poured or cast into the through-opening 11 of the second mold 10 in a quantity substantially equal to the volume of the mold cavity defined by the through-opening 11, when one of the second molds 10 is positioned just beneath the second container 16 while containing the first chocolate material which is not solidified and still in the course of crystallization of the base oils and fats contained therein. Although not shown in the drawings, means for scraping the top face of each second mold 10 may be provided. FIG. 5 shows the second chocolate material 15 cast in the second mold 10 combined with the first mold 4. The second chocolate material may be a regular brown chocolate material or may be a variety of chocolate materials having a color different from that of the first chocolate material. A brown chocolate material may be used as the first chocolate material and combined with a white second chocolate material. However, in order to produce a chocolate block having an ornamental relief pattern made of first chocolate material which is integrally joined with the second chocolate material forming the body portion of the chocolate block, the contents and kinds of the base oils and fats contained in the first and second chocolate materials should be determined in consideration of the melting points and percentage shrinkages thereof. The contents and kinds of the base oils and fats should be controlled to produce a final chocolate block having clear ornamental relief pattern having a color which is in good contrast with the color of the body portion. In this connection U.S. Pat. No. 4,382,968 disclosing an invention invented by me will be incorporated herein as a reference. Similarly to the first chocolate material, the second chocolate material is stored in the second container 16 generally at a temperature of from 29° to 31° C. However, the storage temperature is not limited as far as the chocolate material is stored in a fluidized state.

Then, the combined first and second molds 4 and 10 pass through a second cooler 17 as the conveyer 1 moves intermittently, whereupon the first and second chocolate materials are solidified to form an integral chocolate block. The temperature and time for cooling to solidify the chocolate block are varied depending on the thickness of the body portion of the block, and it takes generally about 15 to 25 minutes to solidify the chocolate material cast at a temperature of from 29° to 31° C. in a cooler maintained at 4° to 7° C. A vibrator 18 may be provided to vibrate the combined first and second molds 4 and 10 prior to this cooling step thereby to remove air bubbles in the second chocolate material.

Figure 6:
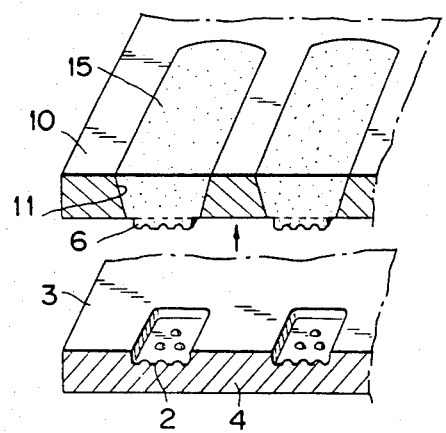
FIG. 6 is a schematic illustration showing a portion of the second mold carrying the molded first and second chocolate materials and a portion of the first mold separated from the second mold.

Then, the second mold 10 is raised by a mold separator 19 while leaving the first mold 4 on the conveyer 1, whereby the solidified first chocolate material 6 adhering onto the solidified second chocolate material 15 is taken out of the first mold 4, as shown in FIG. 6. Since the side wall of the through-opening 11 of the second mold 10 is slightly tapered such that the through-opening 11 extends upwardly, the molded chocolate block is carried by the second mold 10. The molded chocolate block having an ornamental relief pattern may be removed from the second mold 10 by inverting the second mold 10.

As has been described hereinbefore, when the second chocolate material 15 forming the body portion of the chocolate block is poured into the second mold 10, the second chocolate material 15 oozes from the bottom of the second mold to penetrate into the interface gap inevitably formed between the top face of the first mold 4 and the bototm face of the second mold 10, so that the second chocolate material adheres onto the bottom face 13 of the second mold 10 and also onto the top face of the first mold 4. If the first mold 4 is used repeatedly in the next cycle operations with the top face 3 carrying the thus adhering second chocolate material, the first chocolate material is seriously contaminated with the second chocolate material left uncleaned at the steps of casting the first chocolate material 6 into the engraved mold cavity 2 of the first mold 4 and pressing the thus cast first chocolate material 6 into the engraved mold cavity 2 by scraping, leading to unfavorable deterioration in commercial value. Occasionally, the first chocolate material is left on the molds without being scraped.

According to the present invention, a cleaner 20 is provided between the mold separator 19 and the first container 5 in order to remove the residual chocolate materials, particularly the second chocolate material, adhering onto the top face 3 of the first mold 4.

Figure 7:
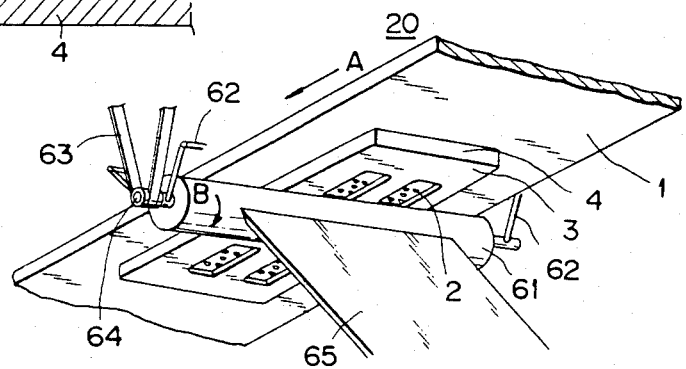
FIG. 7 is a perspective view showing one embodiment of the cleaner means for removing the second chocolate material from the first mold.

Referring to FIG. 7 showing one embodiment of the cleaner 20, a roller 61 made of a resilient material, such as synthetic resins or rubbers, is rotatably carried by a bracket 62 and spaced from the conveyer 1 so that the circumferential face of the rotating roller 61 is pressed onto the top face 3 of each first mold 4. The roller 61 may be carried for free rotation as the conveyer 1 moves in the direction shown by the arrow A to remove the chocolate material adhering on the top face 3 of the mold 4. However, in order to ensure effective removal of the adhering chocolate material, it is preferred that the rotating shaft 64 of the roller 61 is rotated in the direction reverse to the travelling direction of the conveyer 1, i.e. in the direction shown by the arrow B, by the driving belt 63. The efficiency for removing the adhering chocolate material may be increased by rotating the roller 61 at a circumferential speed of higher than the travelling speed of the conveyer 1, more preferably by rotating the roller 61 at a circumferential speed of more than two times as high as the travelling speed of the conveyer 1. The chocolate materials transferred to the roller 61 is scraped by a scraper plate 65. A heater may be provided internally of the roller 61 for softening the chocolate materials to facilitate easy take-up of the solidified chocolate materials from the mold 4. Otherwise, a heating chamber (not shown) may be provided upstream of the cleaner 20 to soften the adhering chocolate materials.

Figure 8:
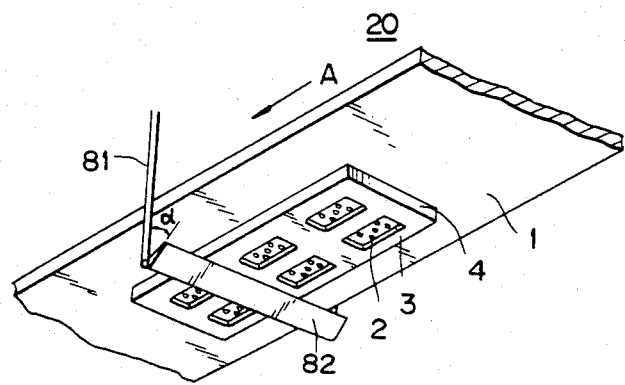
FIG. 8 is a perspective view showing another embodiment of the cleaner means.

Another embodiment of the cleaner 20 is shown in FIG. 8. In this embodiment, a scraper blade 82 carried by brackets 81 is provided in lieu of the roller 61 in the preceding embodiment. The face 3 of the mold 4 is scraped by the scraper blade 82 as it moves across the scraper blade 82 by the conveyer 1, whereupon the chocolate materials adhering thereon are scraped off. The blade 82 is slanted at an angle α, as shown, to ensure positive scraping. The angle α between the blade 82 and the face 3 of the mold 4 ranges generally 5° to 45°. By the use of the scraper blade 82, the adhering chocolate materials may be removed in the solidified state without the need of softening.

Figure 9:
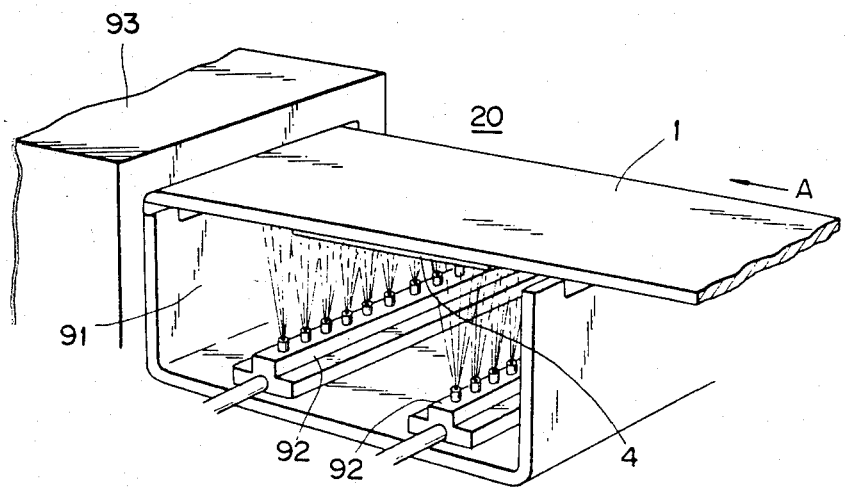
FIG. 9 is a perspective view showing a further embodiment of the cleaner means.

A further embodiment of the cleaner 20 shown in FIG. 9 comprises a rising chamber 91 and a drying chamber 93. The rinsing chamber may be a warm water reservoir through which each mold 4 passes. However, it is preferred that a plurality of spray nozzles 92 is provided in the rinsing chamber 91 for spraying warm water therefrom to the face 3 of the mold 4, as shown in FIG. 9. The mold 4 rinsed with warm water is then dried in the drying chamber 92.

A plurality of cleaners 20, which may be either one of the embodiments shown in FIGS. 7 to 9, may be provided in line with each other. For example, the cleaner shown in FIG. 7 may be combined with the cleaner shown in FIG. 9.

Although the present invention has been described with reference to the preferred embodiments. it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. An apparatus for continuously and automatically molding a chocolate block including an ornamental relief pattern made of a first chocolate material of one color and a body portion carrying said ornamental relief pattern and made of a second chocolate material of different color, comprising:
   (a) conveyer means for carrying thereon a plurality of first molds successively placed at intervals, each first mold having a top face provided with at least one engraved mold cavity;
   (b) means for casting a fluidized first chocolate material for forming said ornamental relief pattern into each of the engraved mold cavities of said first molds one by one;
   (c) a scraper for scraping the top face of each first mold to press said first chocolate material into said engraved mold cavity and to scrape off the excess first chocolate material;
   (d) a first cooler for cooling said first chocolate material contained in said engraved mold cavity of said first mold;
   (e) means for placing a second mold in situ on each of said first molds, said second mold having at least one through-opening defining said body portion and being free from permanent connection with said first mold;
   (f) means for casting a fluidized second chocolate material into said second mold combined with said first mold through said through-opening;
   (g) a second cooler for successively cooling said first and second chocolate materials contained in the combined first and second molds to solidify the same;
   (h) means for removing the solidifed first and second chocolate materials from the molds to obtain an integral product chocolate block; and
   (i) cleaner means for cleaning said first molds to remove the chocolate materials adhering thereon, said cleaner means being disposed between said means (b) and said means (h).

2. The apparatus according to claim 1, wherein said cleaner means comprises a scraper blade for scraping the face of each first mold.

3. The apparatus according to claim 2, wherein said scraper blade is slanted at an angle of from 5° to 45° relative to the face of each first mold.

4. The apparatus according to claim 1, wherein said cleaner means comprises a rinsing chamber for rinsing the face of each first mold with warm water, and a drying chamber for drying the thus rinsed first mold.

5. The apparatus according to claim 4, wherein a plurality of spray nozzles for spraying warm water therefrom to the face of each first mold is provided in said rinsing chamber.

6. The apparatus according to claim 1, wherein said cleaner means comprises a roller adapted to contact with the face of each first mold and made of a resilient material, and a scraper plate having an edge abutting against a portion of the peripheral face of said roller.

7. The apparatus according to claim 6, wherein said roller is carried for free rotation as it contacts with the face of each first mold.

8. The apparatus according to claim 6, wherein a heater is contained internally of said roller.

9. The apparatus according to claim 6, further comprises a heating chamber disposed upstream of said cleaner means.

10. The apparatus according to claim 6, wherein said roller is rotatable in the direction reverse to the travelling direction of said conveyer.

11. The apparatus according to claim 10, wherein said roller is rotatable at a circumferential speed of higher than the travelling speed of said conveyer.

12. The apparatus according to claim 11, wherein said roller is rotatable at a circumferential speed of more than two times as high as the travelling speed of said conveyer.

* * * * *